Sept. 27, 1966 M. CIANCIOLA 3,275,854
CURRENT DRIVER
Filed Nov. 23, 1964
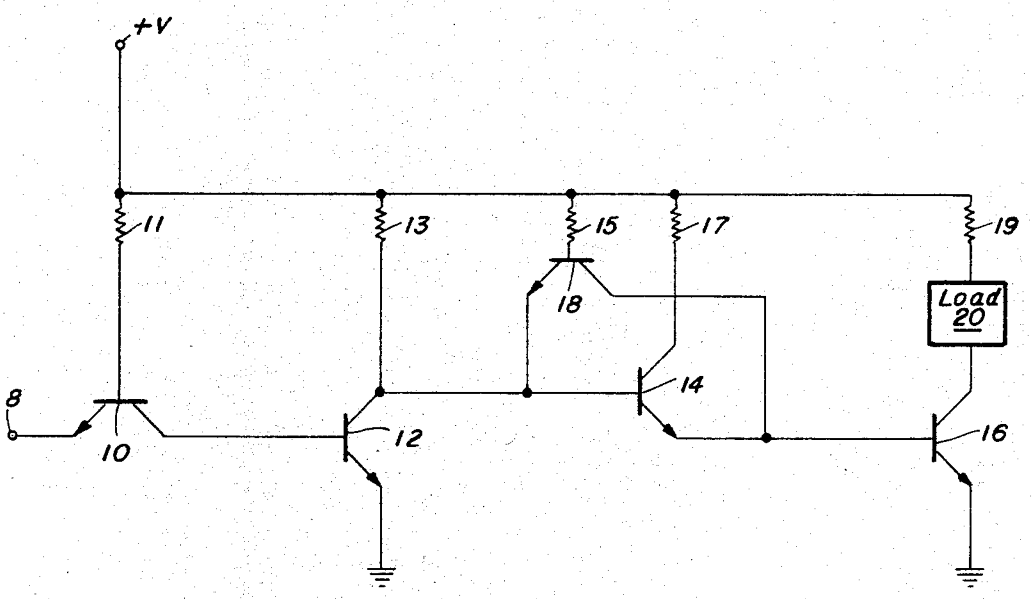
INVENTOR
MICHAEL CIANCIOLA
BY
ATTORNEY

United States Patent Office 3,275,854
Patented Sept. 27, 1966

3,275,854
CURRENT DRIVER

Michael Cianciola, Vista, Calif., assignor to General Precision, Inc., a corporation of Delaware Filed Nov. 23, 1964, Ser. No. 413,065
5 Claims. (Cl. 307—88.5)

This invention relates to electronic switching circuitry and more particularly to a novel and improved switching circuit which draws current from, or forces current into, the base of a switching device such as a transistor or the like.

A particular need has developed for a circuit which increases the speed of electron flow to and from the base of a switching device, such as a transistor, and particularly when switching current to a load. One such load which requires a fast switching action is that of a transducer write coil, when actually writing information in a memory system of a digital computer. One of the factors which enhances the speed of the computer itself is the ability to write the actual information into the memory at a faster speed.

Briefly described, this invention provides a pair of compound connecting transistors, commonly known as a Darlington pair, the last stage of which supplies current to a load. The operation of a Darlington pair is well known in the art wherein a small amount of current to the base of the first transistor supplies a larger amount of turn-on current to the base of a second transistor switching device which will then provide larger currents to a load. The present invention provides a means which actually removes the excess charge from the base of a transistor to rapidly render it nonconductive or actually forces a positive charge on the base of a transistor to rapidly render the transistor conductive.

One object of this invention is to provide an electronic switching circuit which supplies fast turn-on and turn-off current to a switching transistor.

Another object of this invention is to provide write current to the write coil of a magnetic memory transducer with a comparatively fast rise time.

These and other objects will become apparent when taken in consideration with the following detailed description and the accompanying drawing in which the single figure illustrates the schematic drawing of this circuit.

Referring now to the drawing wherein like reference characters designate like or corresponding parts throughout the several views, there is shown in the single figure an NPN transistor 10 which is provided to accept logic inputs at its emitter via terminal 8. Logic inputs for this configuration are near ground level for "low," and base voltage of transistor 10 for "high." The plus 10 volt supply and the resistor 11 provide the base current for transistor 10. The resistor 11 may have a value of 10K.

An NPN transistor 12 has its base coupled to the collector of the collector of transistor 10, its emitter grounded, and its collector coupled to the +10 volt supply through resistor 13 which may have, for example, a value of 1K.

When the signal on the emitter of transistor 10 goes negative with respect to the base, the base of transistor 12 assumes a negative charge with respect to its emitter and thereby renders transistor 12 nonconductive. When the signal at terminal 8 is positive (with respect to its base) the base of transistor 12 assumes a positive charge, thereby rendering transistor 12 conductive.

An NPN transistor 14 has its base coupled to the collector of transistor 12 and its collector coupled to a 10 volt power supply through resistor 17, which may have, for example, a value of 130 ohms. The emitter of transistor 14 is coupled directly to the base of transistor 16 forming a modified Darlington pair combination. Such a combination is well known to those skilled in the art and is readily used to assure large collector currents on the second transistor (transistor 16) in the pair. By actuating the transistor 14 to be conducting with a small amount of current on its base, transistor 14 supplies a greater quantity of current to base of transistor 16 by virtue of the 130 ohms resistor 19 and the 10 volts.

An NPN transistor 18 has its emitter coupled between the collector of transistor 12 and the base of transistor 14, while the base of transistor 18 is biased positive by the 10 volt power supply and the resistor 15. Resistor 15 may have a value of 10K. The collector of transistor 18 is coupled between the emitter of transistor 14 and the base of transistor 16.

The transistor 16 has its emitter electrode grounded and its collector coupled to a load 20, which may be in the form of a memory system write coil. The load 20 is connected in series between the collector of transistor 16 and the 10 volt power supply.

Turning now to the operation of this circuit, when the high logic turns on transistor 12 through the transistor 10, the voltage on the base of transistor 14 and the emitter of transistor 18 falls to $V_{ce}$ saturation of transistor 12. This renders transistor 14 nonconductive and transistor 18 conducts in the normal direction, thus removing the positive charges from the emitter of transistor 14 to the base of transistor 16 which thereby is rendered nonconducting. It is important to note that not only is the current stopped from flowing to the base of transistor 16 but also that when transistor 18 is conducting, the excess charges are removed from the base of transistor 16 by the collector of transistor 18; hence a faster turn-off of transistor 16.

When low logic turns off transistor 12, the base of transistor 14 and the emitter of transistor 18 are both positive. This condition will render transistor 18 in an inverse direction, placing a positive charge on the base of transistor 16 which will then cause transistor 16 to conduct. The positive current on the base of transistor 14 renders this transistor conducting.

Under normal conditions the switching speed of transistor 16 is relatively slow; however, the base of transistor 18 is always saturated, and it provides very fast switching by virtue of emitter charges; therefore, when the input to transistor 12 is low, transistor 18 will supply turn-on current to transistor 16 before the larger current from transistor 14 arrives, hence a faster rise time of the current conducted by tansistor 16.

It must be understood that various modifications are contemplated in this embodiment, such as change of polarities to the transistors' electron flow, and that numerous modifications may be made therein without departing from the spirit and the scope of the invention as set forth in the appended claims.

What is claimed is:

1. A switching circuit for rapidly supplying an electrical charge of a specific polarity to the base electrode of a switching means comprising:
   - a first electronic switching means including an input means and an output means;
   - a second switching menas including an input means and an output means, said first electronic switching means and said second electronic switching means coupled in cascade with the input of said second electronic switching means coupled to the input of said first electronic switching means; and
   - a second switching means including an input means and with said first electronic switching means, said third electronic switching means being inversely conducting with said first electronic switching means when a signal is presented to the input of said first electronic switching means.

2. A switching circuit as defined in claim 1 wherein said third electronic switching means is a transistor having an emitter, a collector, and a base, the base of said transistor being biased in a normally on condition, the emitter of said transistor being coupled to the input means of said first electronic switching means and the collector of said transistor being coupled to the input means of said second electronic switching means, and the output means of said first electronic switching means.

3. A switching circuit as defined in claim 2 wherein said first electronic switching means and said second electronic switching means being a pair of compound connected transistors.

4. A switching circuit for supplying a specific electrical charge to the base electrode of a switching device comprising; a first electron discharge device having an emitter, a collector, and a base; a second electron discharge device having an emitter, a collector, and a base, said emitter of said second electron discharge device coupled to the base of said first electron discharge device, said collector of said second electron discharge device coupled to a current source, and said base of said second electron discharge device adapted to receive an input signal; a third electron discharge device having an emitter, a collector, and a base, said base of said third electron discharge device coupled to said current source, said emitter of said third electron discharge device coupled to said base of said second electron discharge device, and a load coupled between the collector of said first electron discharge device and said current source, whereby said third electron discharge device is adapted to supply a specific charge to the base of said first electron discharge device responsive to said input signal on said emitter electrode of said third electron discharge device and base electrode of said second electron discharge device.

5. A switching circuit for supplying a specific electrical charge to the base electrode of a switching device comprising; a first transistor having an emitter, a collector, and a base; a second transistor having an emitter, a collector, and a base, said emitter of said second transistor coupled to the base of said first transistor, said collector of said second transistor coupled to a current source, and said base of said second transistor adapted to receive an input signal; a third transistor having an emitter, a collector and a base, said base of said third transistor coupled to said current source, said emitter of said third electrode coupled to said base of said second transistor device, and a load coupled to the collector of said first transistor and said current source, whereby said third transistor is adapted to supply a charge to the base of said first transistor responsive to said input signal on said emitter electrode of said third transistor and base electrode of said second transistor.

References Cited by the Examiner

UNITED STATES PATENTS

| | | | |
|---|---|---|---|
| 2,993,127 | 7/1961 | Noll | 307—88.5 |
| 3,127,524 | 3/1964 | Dever | 307—88.5 |
| 3,160,765 | 12/1964 | Krossa | 307—88.5 |

OTHER REFERENCES

Hillman et al., Signal Gate Circuit Using Transistors, RCA Technical Note No. 303, November 1959.

ARTHUR GAUSS, *Primary Examiner.*

I. C. EDELL, R. H. EPSTEIN, *Assistant Examiners.*